United States Patent
Di Nicolo' et al.

(10) Patent No.: US 11,554,351 B2
(45) Date of Patent: *Jan. 17, 2023

(54) POROUS MEMBRANES

(71) Applicant: SOLVAY SPECIALTY POLYMERS ITALY S.P.A., Bollate (IT)

(72) Inventors: Emanuele Di Nicolo', Gorla Minore (IT); Silvia Rita Petricci, Bresso (IT); Pasquale Campanelli, Limbiate (IT); Lionel De Beauffort, Tervuren (BE)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 447 days.

This patent is subject to a terminal disclaimer.

(21) Appl. No.: 16/324,056

(22) PCT Filed: Aug. 7, 2017

(86) PCT No.: PCT/EP2017/069898
§ 371 (c)(1),
(2) Date: Feb. 7, 2019

(87) PCT Pub. No.: WO2018/029131
PCT Pub. Date: Feb. 15, 2018

(65) Prior Publication Data
US 2019/0168174 A1 Jun. 6, 2019

(30) Foreign Application Priority Data

Aug. 9, 2016 (EP) .................................... 16183379

(51) Int. Cl.
| | | |
|---|---|---|
| B01D 71/54 | (2006.01) | |
| B01D 69/02 | (2006.01) | |
| B01D 71/52 | (2006.01) | |
| B01D 71/82 | (2006.01) | |
| C09D 175/04 | (2006.01) | |
| C08L 75/04 | (2006.01) | |
| C09D 175/08 | (2006.01) | |
| B01D 71/80 | (2006.01) | |
| B01D 67/00 | (2006.01) | |
| B01D 53/22 | (2006.01) | |
| B01D 69/06 | (2006.01) | |
| C08G 18/50 | (2006.01) | |
| C08G 18/66 | (2006.01) | |
| C08G 18/76 | (2006.01) | |
| C08G 18/32 | (2006.01) | |
| C08G 18/22 | (2006.01) | |
| C08G 18/40 | (2006.01) | |
| C08G 18/42 | (2006.01) | |
| C09D 7/20 | (2018.01) | |

(52) U.S. Cl.
CPC ........... B01D 71/54 (2013.01); B01D 53/228 (2013.01); B01D 67/0011 (2013.01); B01D 67/0016 (2013.01); B01D 69/02 (2013.01); B01D 69/06 (2013.01); B01D 71/52 (2013.01); B01D 71/80 (2013.01); B01D 71/82 (2013.01); C08G 18/222 (2013.01); C08G 18/3206 (2013.01); C08G 18/4018 (2013.01); C08G 18/4277 (2013.01); C08G 18/5015 (2013.01); C08G 18/6674 (2013.01); C08G 18/7671 (2013.01); C08L 75/04 (2013.01); C09D 7/20 (2018.01); C09D 175/04 (2013.01); C09D 175/08 (2013.01); B01D 2325/02 (2013.01); B01D 2325/24 (2013.01); B01D 2325/38 (2013.01)

(58) Field of Classification Search
None
See application file for complete search history.

(56) References Cited

U.S. PATENT DOCUMENTS 5,332,798 A    7/1994 Ferreri et al.

FOREIGN PATENT DOCUMENTS

GB           1417564 A  * 12/1975  ............. B01D 61/18

OTHER PUBLICATIONS

Kim et al., Preparation of Water Repellent Polyurethane Coating Films Using Perfluoroalkyl Alcohol, 54 Korean Chem. Eng. Res. 387, 387-393 (2016). (Year: 2016).*
Khayet et al., Study on Surface Modification by Surface-Modifying Macromolecules and Its Applications in Membrane-Separation Processes, 89 J. Appl. Polym. Sci., 2902, 2902-2916 (2003). (Year: 2003).*
Khayet M. et al., "Study on surface modification by surface-modifying macromolecules and its applications in membrane separation processes", Journal of Applied Polymer Science, 2003, p. 2902-2916, vol. 89, Wiley Periodicals Inc.
Kim N. W. et al., "Preparation of water repellent polyurethane coating films using perfluoroalkyl alcohol", Korean Chem. Eng. Res., 2016, p. 387-393, vol. 54 (3).
Porter M.C., "Pore size determination", Handbook of industrial membrane technology, 1990, p. 70-78.
Smolders K. et al., "Terminology for Membrane Distillation", Desalination, 1989, vol. 72, issue 3, p. 249-262—Elsevier Science Publishers B.V., Amsterdam.

* cited by examiner

*Primary Examiner* — Magali P Slawski
*Assistant Examiner* — Brad Gordon
(74) *Attorney, Agent, or Firm* — Osha Bergman Watanabe & Burton LLP

(57) ABSTRACT

The present invention relates to a porous membrane, process for the manufacture thereof and uses thereof.

12 Claims, No Drawings

POROUS MEMBRANES

CROSS-REFERENCE TO RELATED APPLICATIONS

This application is a U.S. national stage entry under 35 U.S.C. § 371 of International Application No. PCT/EP2017/069898 filed Aug. 7, 2017, which claims priority to European patent application No. 16183379.3, filed on Aug. 9, 2016. The entire contents of these applications are explicitly incorporated herein by this reference.

TECHNICAL FIELD

The present invention relates to a porous membrane, process for the manufacture thereof and uses thereof.

BACKGROUND ART

Porous membranes are discrete, thin interface that moderate the permeation of chemical species in contact with them. The key property of porous membranes is their ability to control the permeation rate of chemical species through the membrane itself. This feature is exploited in many different applications like separation applications (water and gas) or drug delivery applications.

Aromatic polymers (such as polysulphones and polyethersulphone), partially fluorinated polymers (such as polyvinylidene fluoride) and polyamides are widely used in the preparation of microfiltration and ultrafiltration membranes due to their good mechanical strength and thermal stability.

Polymeric membranes suitable for use as microfiltration and ultrafiltration typically control the permeation under a "sieve" mechanism since the passage of liquid or gas is mainly governed by a convective flux. Such polymeric membranes are mainly produced by phase inversion methods which can give raise to items with very large fraction of voids (porosity).

Porous polymeric membranes are mainly produced by phase-inversion methods, which provide items with a large fraction of voids (or in other words, with high porosity).

A homogeneous polymeric solution (also referred to as "dope solution") containing a polymer, a suitable solvent and/or a co-solvent and, optionally, one or more additives is typically processed by casting into a film and then brought to precipitation by contacting it with a non-solvent medium by the so-called Non-Solvent Induced Phase Separation (NIPS) process. The non-solvent medium is usually water or a mixture of water and surfactants, alcohols and/or the solvent itself.

Precipitation can also be obtained by decreasing the temperature of the polymeric solution by the so-called Thermal Induced Phase Separation (TIPS) process.

Alternatively, the precipitation may be induced by contacting the film processed by casting with air at a very high water vapour content by the so-called Vapour Induced Phase Separation (VIPS) process.

Still, the precipitation may be induced by evaporation of the solvent from the film processed by casting by the so-called Evaporation Induced Phase Separation (EIPS) process. Typically in this process an organic solvent with low boiling point (such as THF, acetone, MEK and the like) is used in admixture with water (the so called "non-solvent"). The polymer solution is first extruded and then precipitates due to the evaporation of the volatile solvent and the enrichment of the non-solvent.

The above processes can be used in combination and/or in sequence to provide membranes having specific morphology and performances. For example, EIPS process can be combined with the VIPS process and NIPS process in order to complete the coagulation process.

The EIPS process is known as "thermal coagulation process" when polyurethane polymers are used to manufacture porous membranes. In this case, the dope solution is prepared with a pre-polymer and as the membrane is formed, it is stabilized with a thermal post treatment to fix the porous structure and crosslink the pre-polymer.

Surface-modifying macromolecules and application thereof, such as in membrane-separation process, have been disclosed for example by KHAYET, M., et al. Study on surface modification by surface-modifying macromolecules and its applications in membrane separation processes. *Journal of Applied POlymer Science*. 2003, vol. 89, p. 2902-2916. and by NAM WOO KIM, et al. Preparation of water repellent polyurethane coating films using perfluoroalkyl alcohol. *Korean Chem. Eng. Res.* 2016, vol. 54, no. 3, p. 387-393. However, these two articles only discloses partially fluorinated alcohols, which do not comprises a perfluoropolyether chain.

SUMMARY OF INVENTION

It remains nevertheless key to provide for porous membranes exhibiting good mechanical properties and both hydro- and oleo-repellency.

In a first aspect, the present invention pertains to a porous membrane comprising at least one layer obtained from a composition [composition (C)] comprising:

at least one fluorinated polyurethane [F-TPU polymer], said F-TPU polymer comprising recurring units derived from:

optionally [monomer (a)] at least one diol selected from the group comprising poly-ether type diol, poly-ester type diol, polybutadien-diol and polycarbonate-diol;

[monomer (b)] at least one hydroxy-terminated (per)fluoropolyether polymer [PFPE polymer];

[monomer (c)] at least one aromatic, aliphatic or cycloaliphatic diisocyanate; and

[monomer (d)] at least one aliphatic, cycloaliphatic or aromatic diol having from 1 to 14 carbon atoms; and optionally at least one further ingredient.

Said at least one further ingredient is preferably at least one organic solvent [medium (L)]. Said medium (L) is advantageously selected from polar aprotic solvents.

In a second aspect, the present invention relates to a liquid composition [composition ($C^L$)] comprising at least one F-TPU polymer as defined above and at least one polar aprotic solvent.

In a third aspect, the present invention relates to a process for manufacturing a porous membrane, said process comprising:

(i) providing a composition [composition (C)] as defined above;

(ii) processing the composition (C) provided in step (i) thereby providing a film; and (iii) processing the film provided in step (ii) thereby providing a porous membrane.

The porous membrane of the invention is advantageously obtainable by the process of the invention.

DESCRIPTION OF EMBODIMENTS

For the purposes of the present description:
the term "(per)fluoropolyether" is intended to indicate a "fully or partially fluorinated polyether";
the expression "(per)fluoropolyoxyalkylene chain" is intended to indicate a partially or fully fluorinated, straight or branched, polyoxyalkylene chain;
the use of parentheses before and after symbols or numbers identifying compounds, chemical formulae or parts of formulae has the mere purpose of better distinguishing those symbols or numbers from the rest of the text and hence said parentheses can also be omitted;
the term "membrane" is intended to indicate to a discrete, generally thin, interface that moderates the permeation of chemical species in contact with it, said membrane containing pores of finite dimensions;
the expression "F-TPU polymer comprising recurring units derived from" is intended to indicate that the F-TPU polymer is composed of recurring units obtained by reacting together at least monomer (b), monomer (c) and monomer (d), and optionally monomer (a) and monomer (e), for example through a condensation reaction.

Membranes containing pores homogeneously distributed throughout their thickness are generally known as symmetric (or isotropic) membranes; membranes containing pores which are heterogeneously distributed throughout their thickness are generally known as asymmetric (or anisotropic) membranes.

The porous membrane obtainable by the process of the invention may be either a symmetric membrane or an asymmetric membrane.

The asymmetric porous membrane obtainable by the process of the invention typically consists of one or more layers containing pores which are heterogeneously distributed throughout their thickness.

The asymmetric porous membrane obtainable by the process of the invention typically comprises an outer layer containing pores having an average pore diameter smaller than the average pore diameter of the pores in one or more inner layers.

The porous membrane of the invention preferably has an average pore diameter of at least 0.001 μm, more preferably of at least 0.005 μm, and even more preferably of at least 0.01 μm. The porous membrane of the invention preferably has an average pore diameter of at most 50 μm, more preferably of at most 20 μm and even more preferably of at most 15 μm.

Suitable techniques for the determination of the average pore diameter in the porous membranes of the invention are described for instance in Handbook of Industrial Membrane Technology. Edited by PORTER. Mark C. Noyes Publications, 1990. p. 70-78. Average pore diameter is preferably determined by scanning electron microscopy (SEM).

The porous membrane of the invention typically has a gravimetric porosity comprised between 5% and 90%, preferably between 10% and 85% by volume, more preferably between 30% and 90%, based on the total volume of the membrane.

For the purpose of the present invention, the term "gravimetric porosity" is intended to denote the fraction of voids over the total volume of the porous membrane.

Suitable techniques for the determination of the gravimetric porosity in the porous membranes of the invention are described for instance in SMOLDERS K., et al. Terminology for membrane distillation. *Desalination*. 1989, vol. 72, p. 249-262.

The porous membrane of the invention may be either a self-standing porous membrane or a porous membrane supported onto a substrate.

A porous membrane supported onto a substrate is typically obtained by coating said substrate with said porous membrane or by impregnating or dipping said substrate with said composition (C) as defined above.

The porous membrane of the invention may further comprise at least one substrate layer. The substrate layer may be partially or fully interpenetrated by the porous membrane of the invention.

The nature of the substrate is not particularly limited. The substrate generally consists of materials having a minimal influence on the selectivity of the porous membrane. The substrate layer preferably consists of non-woven materials, glass fibers and/or polymeric material such as for example polypropylene, polyethylene and polyethyleneterephthalate.

Preferably, the F-TPU polymer is a block copolymer, i.e. a polymer comprising blocks (also referred to as "segments"), each block comprising recurring units deriving from optional monomer (a), monomer (b), monomer (c) or monomer (d), as defined above.

Preferably, said F-TPU polymer has an average number molecular weight of from 30,000 to about 70,000 Da.

Preferably, said F-TPU polymer has a melting point ($T_m$) of from about 120° C. to about 240° C.

Preferably, said optional at least one monomer (a) has an average number molecular weight of from 500 to 4,000 Da, more preferably of from 1,000 to 4,000.

Preferably, said optional at least one monomer (a) is selected in the group comprising poly(ethylene)glycol, poly (propylene)glycol, poly(tetramethylen)glycol (PTMG), poly (1,4-butanediol)adipate, poly(ethandiol-1,4-butanediol) adipate, poly(1,6-hexandiol-neopentyl)glycol adipate, polycaprolactone-diol (PCL) and polycarbonate-diol. Poly (tetramethylen)glycol, poly-caprolactone-diol and polycarbonate-diol being particularly preferred.

Preferably, said at least one monomer (b) is a hydroxy-terminated (per)fluoropolyether polymer [PFPE polymer], i.e. a polymer comprising a (per)fluoropolyoxyalkylene chain [chain ($R_{pf}$)] having two chain ends, wherein one or both chain ends terminates with at least one —OH group.

Preferably, at least one chain end of said chain ($R_{pf}$) terminates with a group of formula:

$$—CH_2(OCH_2CH_2)_t—OH \quad (I)$$

wherein
t is 0 or from 1 to 5.

More preferably, both chain ends of said chain ($R_{pf}$) terminate with a group of formula (I) as defined above.

Preferably, said chain ($R_{pf}$) is a chain of formula $$—O-D-(CFX^\#)_{z1}—O(R_f)(CFX^*)_{z2}-D^*-O—$$

wherein
z1 and z2, equal or different from each other, are equal to or higher than 1;
$X^\#$ and $X^*$, equal or different from each other, are —F or —$CF_3$, provided that when z1 and/or z2 are higher than 1, $X^\#$ and $X^*$ are —F;
D and $D^*$, equal or different from each other, are an alkylene chain comprising from 1 to 6 and even more preferably from 1 to 3 carbon atoms, said alkyl chain being optionally substituted with at least one perfluoroalkyl group comprising from 1 to 3 carbon atoms;

(R$_f$) comprises, preferably consists of, repeating units R°, said repeating units being independently selected from the group consisting of:
(i) —CFXO—, wherein X is F or CF$_3$;
(ii) —CFXCFXO—, wherein X, equal or different at each occurrence, is F or CF$_3$, with the proviso that at least one of X is —F;
(iii) —CF$_2$CF$_2$CW$_2$O—, wherein each of W, equal or different from each other, are F, Cl, H;
(iv) —CF$_2$CF$_2$CF$_2$CF$_2$O—;
(v) —(CF$_2$)$_j$—CFZ—O— wherein j is an integer from 0 to 3 and Z is a group of general formula —O—R$_{(f\text{-}a)}$-T, wherein R$_{(f\text{-}a)}$ is a fluoropolyoxyalkene chain comprising a number of repeating units from 0 to 10, said recurring units being chosen among the following: —CFXO—, —CF$_2$CFXO—, —CF$_2$CF$_2$CF$_2$O—, —CF$_2$CF$_2$CF$_2$CF$_2$O—, with each of each of X being independently F or CF$_3$ and T being a C$_1$-C$_3$ perfluoroalkyl group.

More preferably, chain (R$_f$) is selected from the following formulae (R$_f$-a) to (R$_f$-c):

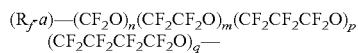

(R$_f$-a)—(CF$_2$O)$_n$(CF$_2$CF$_2$O)$_m$(CF$_2$CF$_2$CF$_2$O)$_p$(CF$_2$CF$_2$CF$_2$CF$_2$O)$_q$— wherein m, n, p, q are 0 or integers selected in such a way as chain R$_f$ meets the above number average molecular weight requirement, with the proviso that if, p and q are simultaneously 0, n is not 0; when m is other than 0, the m/n ratio is preferably between 0.1 and 20; when (m+n) is other than 0, (p+q)/(m+n) is preferably between 0 and 0.2;

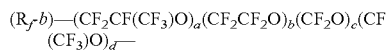

(R$_f$-b)—(CF$_2$CF(CF$_3$)O)$_a$(CF$_2$CF$_2$O)$_b$(CF$_2$O)$_c$(CF(CF$_3$)O)$_d$— wherein a, b, c, d are 0 or integers selected in such a way as chain R$_f$ meets the above number average molecular weight requirement; with the proviso that, at least one of a, c and d is not 0; when b is other than 0, a/b is preferably between 0.1 and 10; when (a+b) is different from 0 (c+d)/(a+b) preferably is between 0.01 and 0.5, more preferably between 0.01 and 0.2;

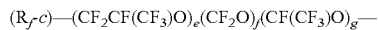

(R$_f$-c)—(CF$_2$CF(CF$_3$)O)$_e$(CF$_2$O)$_f$(CF(CF$_3$)O)$_g$— wherein e, f, g are 0 or integers selected in such a way as chain R$_f$ meets the above number average molecular weight requirement; when e is other than 0, (f+g)/e is preferably between 0.01 and 0.5, more preferably between 0.01 and 0.2.

PFPE polymers wherein chain (R$_f$) complies with formula (R$_f$-a) as defined above, wherein p and q are 0, are particularly preferred in the present invention.

In a preferred embodiment, said PFPE polymer complies with the following formula (PFPE-I):

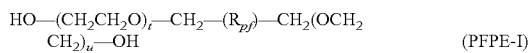

HO—(CH$_2$CH$_2$O)$_t$—CH$_2$—(R$_{pf}$)—CH$_2$(OCH$_2$CH$_2$)$_u$—OH    (PFPE-I)

wherein
t and u are, each independently, 0 or from 1 to 5; and
R$_{pf}$ is as defined above.

Preferably, said PFPE polymer has an average number molecular weight of from 400 to 10,000 Da, more preferably from 1,000 to 5,000.

In a preferred embodiment, the molar ratio between monomers (a) (when present) and monomers (b) is from 2 to 20, more preferably from 2 to 10.

In a preferred embodiment, the amount of monomers (b) is such that the F-TPU polymer comprises from 1 to 80 wt. % of fluorine, preferably from 1 to 70 wt. % based on the weight of the F-TPU polymer.

Preferably, said at least one monomer (c) has a number molecular weight of 500 Da or lower, preferably from 10 to 500 Da.

Preferably, said at least one monomer (c) is selected in the group comprising, preferably consisting of, 4,4'-methylene-diphenylene-diisocyanate (MDI), 1,6-hexan-diisocyanate (HDI), 2,4-toluene-diisocyanate, 2,6-toluene-diisocyanate, xylilen-diisocyanate, naphthalene-diisocyanate, paraphenylen-diisocyanate, hexamaethylen-diisocyanate, isophorone-diisocyanate, 4,4'-dicyclohexyl-methane-diisocyanate and cyclohexyl-1,4-diisocyanate.

MDI and HDI being particularly preferred.

Preferably, said at least one monomer (d) is selected in the group comprising, preferably consisting of, ethylene-glycol, 1,4-butanediol (BDO), 1,6-hexane diol (HDO), N,N-diethanolamine and N,N-diisopropanolaniline. BDO and HDO being particularly preferred.

In a preferred embodiment, the sum of blocks deriving from monomers (c) and (d) is from 10 to 60 wt. % based on the total weight of the F-TPU polymer.

Those skilled in the art would readily understand that blocks comprising recurring units derived from monomer (b) and monomer (a) when present, are rubber-like blocks, while blocks comprising recurring units derived from monomers (c) and (d) are hard blocks.

In a preferred embodiment, at least 80% of the blocks comprising recurring units derived from said monomers (b) [blocks B] are linked, at least one of their ends, to a block comprising recurring units derived from monomers (a) [blocks A] through a block comprising recurring units derived from monomers (c) [blocks C].

In other words, at least 80% of blocks B are contained in a sequence of the following type: -[A-C-B-C]-.

Advantageously, the F-TPU polymer can be prepared according to methods known in the art, such as for example extrusion, injection moulding, casting of a solution of the monomers defined above or following the procedures disclosed in U.S. Pat. No. 5,332,798 (AUSIMONT S.P.A.).

Under step (i) of the process for manufacturing a porous membrane according to the invention, the composition (C) is typically manufactured by any conventional techniques.

Under step (ii) of the process for manufacturing a porous membrane according to the invention, conventional techniques can be used for processing the composition (C) thereby providing a film.

The term "film" is used herein to refer to a layer of composition (C) obtained after processing of the same under step (ii) of the process of the invention. The term "film" is used herein in its usual meaning, that is to say that it refers to a discrete, generally thin, dense layer.

Depending on the final form of the membrane, the film may be either flat, when flat membranes are required, or tubular in shape, when tubular or hollow fiber membranes are required.

According to a first embodiment of the invention, the process for manufacturing a porous membrane is carried out in liquid phase.

The process according to this first embodiment preferably comprises:

(i^) providing a liquid composition [composition (C$^L$)] comprising:
  at least one F-TPU polymer as defined above, and
  a liquid medium [medium (L)];
(ii^) processing composition (C$^L$) provided in step (i) thereby providing a film; and
(iii^) precipitating the film provided in step (ii) thereby providing a porous membrane.

The term "solvent" is used herein in its usual meaning, that is it indicates a substance capable of dissolving another substance (solute) to form an uniformly dispersed mixture at the molecular level. In the case of a polymeric solute, it is common practice to refer to a solution of the polymer in a solvent when the resulting mixture is transparent and no phase separation is visible in the system. Phase separation is taken to be the point, often referred to as "cloud point", at which the solution becomes turbid or cloudy due to the formation of polymer aggregates.

The medium (L) preferably comprises at least one organic solvent. Suitable examples of organic solvents are:
- aliphatic hydrocarbons including, more particularly, the paraffins such as, in particular, pentane, hexane, heptane, octane, nonane, decane, undecane, dodecane or cyclohexane, and naphthalene and aromatic hydrocarbons and more particularly aromatic hydrocarbons such as, in particular, benzene, toluene, xylenes, cumene, petroleum fractions composed of a mixture of alkylbenzenes;
- aliphatic or aromatic halogenated hydrocarbons including more particularly, perchlorinated hydrocarbons such as, in particular, tetrachloroethylene, hexachloroethane;
- partially chlorinated hydrocarbons such as dichloromethane, chloroform, 1,2-dichloroethane, 1,1,1-trichloroethane, 1,1,2,2-tetrachloroethane, pentachloroethane, trichloroethylene, 1-chlorobutane, 1,2-dichlorobutane, monochlorobenzene, 1,2-dichlorobenzene, 1,3-dichlorobenzene, 1,4-dichlorobenzene, 1,2,4-trichlorobenzene or mixture of different chlorobenzenes;
- aliphatic, cycloaliphatic or aromatic ether oxides, more particularly, diethyl oxide, dipropyl oxide, diisopropyl oxide, dibutyl oxide, methylterbutyl ether, dipentyl oxide, diisopentyl oxide, ethylene glycol dimethyl ether, ethylene glycol diethyl ether, ethylene glycol dibutyl ether benzyl oxide; dioxane, tetrahydrofuran (THF);
- dimethylsulfoxide (DMSO);
- glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether;
- glycol ether esters such as ethylene glycol methyl ether acetate, ethylene glycol monoethyl ether acetate, ethylene glycol monobutyl ether acetate;
- alcohols, including polyhydric alcohols, such as methyl alcohol, ethyl alcohol, diacetone alcohol, ethylene glycol;
- ketones such as acetone, methylethylketone, methylisobutyl ketone, diisobutylketone, cyclohexanone, isophorone;
- linear or cyclic esters such as isopropyl acetate, n-butyl acetate, methyl acetoacetate, dimethyl phthalate, γ-butyrolactone;
- linear or cyclic carboxamides such as N,N-dimethylacetamide (DMAc), N,N-diethylacetamide, dimethylformamide (DMF), diethylformamide or N-methyl-2-pyrrolidone (NMP);
- organic carbonates for example dimethyl carbonate, diethyl carbonate, dipropyl carbonate, dibutyl carbonate, ethylmethyl carbonate, ethylene carbonate, vinylene carbonate;
- phosphoric esters such as trimethyl phosphate, triethyl phosphate (TEP);
- ureas such as tetramethylurea, tetraethylurea;
- methyl-5-dimethylamino-2-methyl-5-oxopentanoate (commercially available under the tradename Rhodialsov Polarclean®).

Preferably, said at least one organic solvent is selected from polar aprotic solvents and even more preferably in the group consisting of: N-methyl-pyrrolidone (NMP), dimethyl acetamide (DMAc), dimethylformamide (DMF), dimethylsulfoxide (DMSO), tetrahydrofuran (THF), methyl-5-dimethylamino-2-methyl-5-oxopentanoate (commercially available under the tradename Rhodialsov Polarclean®) and triethylphosphate (TEP).

The medium (L) preferably comprises at least 40 wt. %, more preferably at least 50 wt. % based on the total weight of said medium (L), of at least one organic solvent. Medium (L) preferably comprises at most 100 wt. %, more preferably at most 99 wt. % based on the total weight of said medium (L), of at least one organic solvent.

The medium (L) may further comprise at least one non-solvent medium [medium (NS)]. The medium (NS) may comprise water.

Under step (i^), composition ($C^L$) is manufactured by any conventional techniques. For instance, the medium (L) may be added to the F-TPU polymer, or, preferably, the F-TPU polymer may be added to the medium (L), or even the F-TPU polymer and the medium (L) may be simultaneously mixed.

Any suitable mixing equipment may be used. Preferably, the mixing equipment is selected to reduce the amount of air entrapped in composition ($C^L$) which may cause defects in the final membrane. The mixing of the F-TPU polymer and the medium (L) may be conveniently carried out in a sealed container, optionally held under an inert atmosphere. Inert atmosphere, and more precisely nitrogen atmosphere has been found particularly advantageous for the manufacture of composition ($C^L$).

Under step (i^), the mixing time during stirring required to obtain a clear homogeneous composition ($C^L$) can vary widely depending upon the rate of dissolution of the components, the temperature, the efficiency of the mixing apparatus, the viscosity of composition ($C^L$) and the like.

Under step (ii^), composition ($C^L$) is typically processed in liquid phase.

Under step (ii^), composition ($C^L$) is typically processed by casting thereby providing a film.

Casting generally involves solution casting, wherein typically a casting knife, a draw-down bar or a slot die is used to spread an even film of a liquid composition comprising a suitable medium (L) across a suitable support.

Under step (ii^), the temperature at which composition ($C^L$) is processed by casting may be or may be not the same as the temperature at which composition ($C^L$) is mixed under stirring.

Different casting techniques are used depending on the final form of the membrane to be manufactured.

When the final product is a flat membrane, composition ($C^L$) is cast as a film over a flat supporting substrate, typically a plate, a belt or a fabric, or another microporous supporting membrane, typically by means of a casting knife, a draw-down bar or a slot die.

According to a first embodiment of step (ii^), composition ($C^L$) is processed by casting onto a flat supporting substrate to provide a flat film.

According to a second embodiment of step (ii^), composition ($C^L$) is processed to provide a tubular film.

According to a variant of this second embodiment of step (ii^), the tubular film is manufactured using a spinneret.

The term "spinneret" is hereby understood to mean an annular nozzle comprising at least two concentric capillaries: a first outer capillary for the passage of composition ($C^L$) and a second inner one for the passage of a supporting fluid, generally referred to as "lumen".

Hollow fibers and capillary membranes may be manufactured by the so-called spinning process according to this variant of the second embodiment of step (iiˆ). According to this variant of the second embodiment of the invention, composition ($C^L$) is generally pumped through the spinneret. The lumen acts as the support for the casting of composition ($C^L$) and maintains the bore of the hollow fiber or capillary precursor open. The lumen may be a gas, or, preferably, a medium (NS) or a mixture of the medium (NS) with a medium (L). The selection of the lumen and its temperature depends on the required characteristics of the final membrane as they may have a significant effect on the size and distribution of the pores in the membrane.

At the exit of the spinneret, after a short residence time in air or in a controlled atmosphere, under step (iiiˆ) of the process for manufacturing a porous membrane according to this first embodiment of the invention, the hollow fiber or capillary precursor is precipitated thereby providing the hollow fiber or capillary membrane.

The supporting fluid forms the bore of the final hollow fiber or capillary membrane.

Tubular membranes, because of their larger diameter, are generally manufactured using a different process from the one employed for the production of hollow fiber membranes.

The Applicant has found that use of solvent/non-solvent mixtures at a given temperature, in any one of steps (iiˆ) and (iiiˆ) of the process according to the invention, advantageously allows controlling the morphology of the final porous membrane including its average porosity.

The temperature gradient between the film provided in any one of steps (iiˆ) and (iiiˆ) of the process according to the first embodiment of the invention and the medium (NS) may also influence the pore size and/or pore distribution in the final porous membrane as it generally affects the rate of precipitation of the polymer (A) from composition ($C^L$).

According to a first variant of the first embodiment of the invention, the process for manufacturing a porous membrane comprises:
(iˆ*) providing a liquid composition [composition ($C^L$)] comprising:
  at least one F-TPU polymer, and
  a liquid medium comprising at least one organic solvent [medium (L)];
(iiˆ*) processing composition ($C^L$) provided in step (iˆ*) thereby providing a film; and
(iiiˆ*) precipitating the film provided in step (iiˆ*) in a non-solvent medium [medium (NS)] thereby providing a porous membrane.

Under step (iˆ*), the medium (L) preferably further comprises water.

Under step (iiiˆ*), the medium (NS) preferably comprises water and, optionally, at least one organic solvent.

According to a second variant of the first embodiment of the invention, the process for manufacturing a porous membrane comprises:
(iˆ**) providing a liquid composition [composition ($C^L$)] comprising:
  at least one F-TPU polymer, and
  a liquid medium comprising at least one organic solvent [medium (L)];
(iiˆ) processing composition ($C^L$) provided in step (iˆ) thereby providing a film; and
(iiiˆ) precipitating the film provided in step (iiˆ) by cooling thereby providing a porous membrane.

Under step (iˆ**), the medium (L) of composition ($C^L$) advantageously comprises at least one latent organic solvent.

For the purpose of the present invention, the term "latent" is intended to denote an organic solvent which behaves as an active solvent only when heated above a certain temperature.

Under step (iiˆ**), the film is typically processed at a temperature high enough to maintain composition ($C^L$) as a homogeneous solution.

Under step (iiˆ**), the film is typically processed at a temperature comprised between 60° C. and 250° C., preferably between 70° C. and 220°, more preferably between 80° C. and 200° C.

Under step (iiiˆ), the film provided in step (iiˆ) is typically precipitated by cooling to a temperature below 100° C., preferably below 60° C., more preferably below 40° C., typically using any conventional techniques.

Under step (iiiˆ), cooling is typically carried out by contacting the film provided in step (iiˆ) with a liquid medium [medium (L')].

Under step (iiiˆ**), the medium (L') preferably comprises, and more preferably consists of, water.

Alternatively, under step (iiiˆ), cooling is carried out by contacting the film provided in step (iiˆ) with air.

Under step (iiiˆ**), either the medium (L') or air is typically maintained at a temperature below 100° C., preferably below 60° C., more preferably below 40° C.

According to a third variant of the first embodiment of the invention, the process for manufacturing a porous membrane comprises:
(iˆ***) providing a liquid composition [composition ($C^L$)] comprising:
  at least one F-TPU polymer, and
  a liquid medium comprising at least one organic solvent [medium (L)];
(iiˆ*) processing composition ($C^L$) provided in step (iˆ*) thereby providing a film; and
(iiiˆ*) precipitating the film provided in step (iiˆ*) by absorption of a non-solvent medium [medium (NS)] from a vapour phase thereby providing a porous membrane.

Under step (iiiˆ*), the film provided in step (iiˆ*) is preferably precipitated by absorption of water from a water vapour phase.

Under step (iii*), the film provided in step (iiˆ*) is preferably precipitated under air, typically having a relative humidity higher than 10%, preferably higher than 50%.

According to a fourth variant of the first embodiment of the invention, the process for manufacturing a porous membrane comprises:
(iˆ****) providing a liquid composition [composition ($C^L$)] comprising:
  at least one F-TPU polymer, and
  a liquid medium comprising at least one organic solvent [medium (L)];
(iiˆ**) processing composition ($C^L$) provided in step (iˆ**); and
(iiiˆ****) evaporating the medium (L) thereby providing a porous membrane.

Preferably, when the medium (L) comprise more than one organic solvents, step (iiˆ**) comprises processing composition ($C^L$) to provide a film, which is then precipitated in step (iiiˆ**) by evaporation of the medium (L) at a temperature above the boiling point of the organic solvent having the lowest boiling point.

According to a preferred embodiment, step (ii^****) is performed by processing composition ($C^L$) with a high voltage electric field.

For the purpose of the present invention, by the term "non-solvent medium [medium (NS)]" it is meant a medium consisting of one or more liquid substances incapable of dissolving the composition (C) at a given temperature.

The medium (NS) typically comprises water and, optionally, at least one organic solvent selected from alcohols or polyalcohols, preferably aliphatic alcohols having a short chain, for example from 1 to 6 carbon atoms, more preferably methanol, ethanol, isopropanol and ethylene glycol.

The medium (NS) is generally selected among those miscible with the medium (L) used for the preparation of composition ($C^L$).

The medium (NS) may further comprise the medium (L).

More preferably, the medium (NS) consists of water. Water is the most inexpensive non-solvent medium and can be used in large amounts.

The medium (L) is advantageously soluble in water, which is an additional advantage of the process of the present invention.

The process for manufacturing a porous membrane according to the first embodiment may comprise any combination of the first, second, third and fourth variants as defined above. For instance, the porous membrane according to the present invention may be obtainable by the process according to the second variant of the first embodiment of the invention followed by the process according to the first variant of the first embodiment of the invention.

The porous membrane obtainable by the process according to the first embodiment may undergo additional post treatment steps, for instance rinsing and/or stretching.

The porous membrane obtainable by the process according to the first embodiment of the invention is typically rinsed using a liquid medium miscible with the medium (L).

The porous membrane obtainable by the process according to the first embodiment of the invention may be advantageously stretched so as to increase its average porosity.

According to a second embodiment of the invention, the process for manufacturing a porous membrane is carried out in molten phase.

The process according to the second embodiment of the invention preferably comprises the following steps:
(i^^) providing a solid composition [composition ($C^S$)] comprising at least one F-TPU polymer as defined above;
(ii^^-A) processing the composition ($C^S$) provided in step (i^^) thereby providing a film and (iii^^-A) stretching the film provided in step (ii^^-A) thereby providing a porous membrane; or
(ii^^-B) processing the composition ($C^S$) provided in step (i^^) thereby providing fibers and (iii^^-B) processing the fibers provided in (ii^^-B) thereby providing a porous membrane.

Under step (ii^^-A), composition ($C^S$) is preferably processed in molten phase.

Melt forming is commonly used to make dense films by film extrusion, preferably by flat cast film extrusion or by blown film extrusion.

According to this technique, composition ($C^S$) is extruded through a die so as to obtain a molten tape, which is then calibrated and stretched in the two directions until obtaining the required thickness and wideness. Composition ($C^S$) is melt compounded for obtaining a molten composition. Generally, melt compounding is carried out in an extruder. Composition ($C^S$) is typically extruded through a die at temperatures of generally lower than 250° C., preferably lower than 200° C. thereby providing strands which are typically cut thereby providing pellets.

Twin screw extruders are preferred devices for accomplishing melt compounding of composition ($C^S$).

Films can then be manufactured by processing the pellets so obtained through traditional film extrusion techniques. Film extrusion is preferably accomplished through a flat cast film extrusion process or a hot blown film extrusion process. Film extrusion is more preferably accomplished by a hot blown film extrusion process.

Under step (iii^^-A), the film provided in step (ii^^-A) may be stretched either in molten phase or after its solidification upon cooling.

The porous membrane obtainable by the process of the invention is typically dried, preferably at a temperature of at least 30° C.

Drying can be performed under air or a modified atmosphere, e.g. under an inert gas, typically exempt from moisture (water vapour content of less than 0.001% v/v). Drying can alternatively be performed under vacuum.

The porous membrane of the invention may be in the form of flat membranes or in the form of tubular membranes.

Flat membranes are generally preferred when high fluxes are required whereas hollow fibers membranes are particularly advantageous in applications wherein compact modules having high surface areas are required.

Flat membranes preferably have a thickness comprised between 10 μm and 200 μm, more preferably between 15 μm and 150 μm.

Tubular membranes typically have an outer diameter greater than 3 mm. Tubular membranes having an outer diameter comprised between 0.5 mm and 3 mm are typically referred to as hollow fibers membranes. Tubular membranes having a diameter of less than 0.5 mm are typically referred to as capillary membranes.

As used within the present description, "composition (C)" is intended to include both the liquid composition [composition ($C^L$)] and the solid composition [composition ($C^S$)], unless otherwise specified.

According to a preferred embodiment, composition (C) is free of plasticizer agents, i.e. plasticizer agents are not added to composition (C) or they are present in an amount of less than 1 wt. %, more preferably less than 0.1 wt. % based on the total weight of said composition (C).

Preferably, composition (C) comprises said F-TPU polymer in an amount of from 0.1 to 100 wt. % based on the total weight of said composition (C).

Preferably, composition (C) comprises at least one further ingredient, more preferably said at least one further ingredient is in an amount of from 0.1 to 30 wt. % based on the total weight of said composition (C).

Said optional at least one further ingredient is preferably selected in the group comprising: polar aprotic solvents [medium (L)] as defined above, pore forming agents, nucleating agents, fillers, latent organic solvents, surfactants, and polymers different from the F-TPU polymer, such as for example polyvinylidenfluoride, polysulfones, polyethersulfones and hydrogenated thermoplastic polyurethane (TPU) polymers.

Said polymers different from the F-TPU polymer are preferably added to composition (C) in an amount of from 0.1 to 15 wt. % based on the total weight of composition (C).

Pore forming agents are typically added to the composition (C) in amounts usually ranging from 0.1% to 30% by weight, preferably from 0.5% to 5% by weight. Suitable pore forming agents are for instance polyvinyl-pyrrolidone (PVP) and polyethyleneglycol (PEG), with PVP being preferred.

Pore forming agents are generally at least partially, if not completely, removed from the porous membrane in the medium (NS), if any, under step (iii) of the process for manufacturing a porous membrane according to the first embodiment of the invention.

Composition ($C^L$) preferably comprises at least one F-TPU polymer in an amount of at least 1 wt. %, more preferably of at least 5 wt. %, based on the total weight of said composition ($C^L$).

Composition ($C^L$) preferably comprises at least one F-TPU polymer in an amount of at most 99 wt. %, more preferably of at most 95 wt. %, based on the total weight of said composition ($C^L$).

Even more preferably, composition ($C^L$) comprises at least one F-TPU polymer in an amount from 55 to 90 wt. % based on the total weight of said composition ($C^L$).

Composition ($C^L$) preferably comprises at least one medium (L) in an amount of at most 99 wt. %, more preferably of at most 95 wt. %, based on the total weight of said composition ($C^L$).

Composition ($C^L$) preferably comprises at least one medium (L) in an amount of at least 1 wt. %, more preferably of at least 5 wt. %, based on the total weight of said composition ($C^L$).

Even more preferably, composition ($C^L$) comprises from 10 to 45 wt. % of at least one medium (L) based on the total weight of said composition ($C^L$).

Further, in addition, a limited amount of a medium (NS) for the F-TPU polymer may be added to composition ($C^L$), in an amount generally below the level required to reach the cloud point, typically in amount of from 0.1% to 40% by weight, preferably in an amount of from 0.1% to 20% by weight, based on the total weight of composition ($C^L$).

Without being bound by this theory, it is generally understood that the addition of a medium (NS) to composition ($C^L$) will increase the rate of demixing/coagulation under step (iii) of the process for manufacturing a porous membrane according to the first embodiment of the invention thereby providing a more advantageous membrane morphology.

Composition ($C^L$) can optionally comprise at least one further ingredient, selected from those disclosed above for composition (C), in the same amounts.

Composition ($C^S$) preferably comprises at least one F-TPU polymer in an amount of at least 90 wt. %, more preferably of at least 95 wt. %, based on the total weight of said composition ($C^S$).

Composition ($C^S$) preferably comprises at least one F-TPU polymer in an amount of at most 99.8 wt. %, more preferably of at most 99 wt. %, based on the total weight of said composition ($C^S$).

Even more preferably, said composition ($C^S$) comprises at least one F-TPU polymer in an amount of from 92 to 99 wt. % based on the total weight of said composition ($C^S$).

Composition ($C^S$) can optionally comprise at least one further ingredient, selected from those disclosed above for composition (C), in the same amounts.

The porous membrane according to the present invention can be used in several technical fields, notably for the filtration of liquid and/or gas phases or it is embedded or laminated into a multi-layered fabric, in order to provide the so-called 'breathable fabric'.

Thus, in a fourth aspect, the present invention pertains to use of the porous membrane of the invention for the filtration of liquid and/or gas phases comprising one or more solid contaminants.

In a fifth aspect, the present invention relates to a method for filtering a liquid phase and/or a gas phase comprising one or more solid contaminants, said method comprising contacting said liquid phase and/or gas phase comprising one or more solid contaminants with the porous membrane of the invention.

Liquid and gas phases comprising one or more solid contaminants are also referred to as "suspensions", i.e. heterogeneous mixtures comprising at least one solid particle (the contaminant) dispersed into a continuous phase (or "dispersion medium", which is in the form of liquid or gas).

Said at least one solid contaminant preferably comprises comprising microorganisms, preferably selected from the group consisting of bacteria such as *Staphylococcus aureus* and *Pseudomonas aeruginosa*, algae, fungi, protozoa and viruses.

In one embodiment, two or more porous membranes according to the present invention can be used in series for the filtration of a liquid and/or gas phase. Advantageously, a first filtration step is performed by contacting liquid and/or gas phases comprising one or more solid contaminants with a porous membrane according to the present invention having an average pore diameter higher than 5 μm, more preferably from 5 to 50 μm; and a second filtration step is performed after said first filtration step, by contacting the same liquid and/or gas phase with a porous membrane according to the present invention having an average pore diameter of from 0.001 to 5 μm.

Alternatively, at least one porous membrane according to the present invention is used in series with at least one porous membrane obtained from a composition different composition (C) according to the present invention.

Then in a sixth aspect, the present invention relates to a fabric comprising at least two layers, wherein at least one layer comprises a porous membrane according to the present invention having an average pore diameter of from 0.001 to 5 μm.

Breathable fabrics are typically designed for use in garments that provide protection from wind, rain and loss of body heat. Breathable fabrics are typically also waterproof (and hence referred to as waterproof breathable fabrics, WBF), in order to prevent the penetration and absorption of liquid water. The term "breathable" is intended to indicate that the fabric passively allows water vapour due to perspiration from the body to diffuse through the fabric, yet still preventing the penetration of liquid water from the outside.

WBFs are typically manufactured as continuous rolls of 1.5 to 2 meters wide and 100 to 5000 meters long. WBFs can be manufactured for example as follows:

providing a substrate, such as for example woven substrates or polymeric substrates;

contacting said substrate with composition (C) as defined above;

optionally, transfer coating; and lamination.

Should the disclosure of any patents, patent applications, and publications which are incorporated herein by reference conflict with the description of the present application to the extent that it may render a term unclear, the present description shall take precedence.

The invention will be herein after illustrated in greater detail by means of the Examples contained in the following Experimental Section; the Examples are merely illustrative and are by no means to be interpreted as limiting the scope of the invention.

Experimental Section

Materials
Monomer (a):
CAPA™ 2201 (from Perstorp) polycaprolactone-diol (PLC) having molecular weight (Mw) of about 2,000 and —OH value of about 56 mg KOH/g;
Monomer (b) having formula:

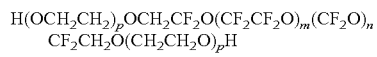

with p=4.7 and Mw of about 2,000
Monomer (c):
diphenylen-4,4'-diisocyanate (MDI)
Monomer (d):
1,4-butanediol (BDO)
Catalyst:
zinc neodecanoate
Solvents and additives were obtained from Sigma Aldrich:
dimethylacetamide (DMAc) and triethylphosphate (TEP) polytehtylen glycol (PEG) 200, isopropyl alcohol (IPA)
H-TPU 1: commercially available aliphatic polycaprolactone based thermoplastic hydrogenated polyurethane was used as comparison.
Methods Preparation of F-TPU Polymer Specimens F-TPU polymer specimens 1 to 4 and comparative H-TPU 2 were prepared starting from the abovementioned monomers following the same procedure detailed in Example 15 of U.S. Pat. No. 5,332,798 (to Ausimont S.p.A.) cited above. The monomers were used in the molar ratios reported in the following Table 1.

TABLE 1

| | Monomers (molar ratio) | | | |
|---|---|---|---|---|
| | a | b | c | d |
| F-TPU 1 | 0.75 | 0.25 | 3.0 | 2.0 |
| F-TPU 2 | 0.29 | 0.71 | 3.0 | 2.0 |
| F-TPU 3 | — | 1.0 | 3.0 | 2.0 |
| H-TPU 2(*) | 1.0 | — | 3.0 | 2.0 |

(*)comparison

Solution Preparation
Solutions were prepared by adding each polymer and the additive in the solvent DMAC or TEP. After mixing, stirring was performed with a mechanical anchor for 4 hours at 60° C.

Porous Membrane Preparation
Method A:
Flat sheet porous membranes were prepared by filming the solution prepared following the procedure disclosed above over a smooth glass support by means of an automatized casting knife.
Membrane casting was performed by holding dope solutions, the casting knife and the support temperatures at 25° C., so as to prevent premature precipitation of the polymer. The knife gap was set to 250 µm. After casting, polymeric films were immediately immersed in a coagulation bath in order to induce phase inversion. The coagulation bath consisted of pure de-ionized water or a mixture Isopropyl alcohol (IPA)/water 50/50 v/v. After coagulation the membranes were washed several times in pure water during the following days to remove residual traces of solvent. The membranes were always stored (wet) in water.

Method B:
Flat sheet porous membranes were obtained by dipping commercial filters in a solution 10% w/w of F-TPU 3 in THF (prepared following the procedure disclosed above in "solution preparation") with the following procedure: filters measuring 6×6 cm² were dipped in the above solution for 2 minutes and then dried in a vacuum oven at 50° C. for 4 hours.

Measurement of Contact Angle (CA)

The contact angle towards water and hexadecane (C16) was evaluated at 25° C. by using the DSA10 instrument (from Krüss GmbH, Germany) according to ASTM D5725-99. The measures were taken at the up side (interface with air) of the membrane.

Mechanical Properties

Mechanical properties on flat sheet porous membranes were assessed at room temperature (23° C.) following ASTM D 638 standard procedure (type V, grip distance=25.4 mm, initial length Lo=21.5 mm). Velocity was between 1 and 50 mm/min. The flat sheet porous membranes stored in water were took out from the container boxes and immediately tested.

The results obtained for membranes prepared following Method A as disclosed above are summarized in the following Tables 2 and 3.

TABLE 2

| Membrane No. | Ingredient (s) | Amount (wt. %) | Solvent | Coagulation bath | SCA water (°) | SCA C16 (°) |
|---|---|---|---|---|---|---|
| 1 | F-TPU 1 | 15 | DMAc | water | 101 | 66 |
| 2 | F-TPU 1 PEG200 | 12 3 | DMAc | water | 100 | 66 |
| 3 | F-TPU 1 PEG200 | 12 3 | DMAc | Water/IPA 50/50 | 97 | 64 |
| 4(*) | H-TPU 1 | 15 | DMAc | water | 92 | wet |
| 5(*) | H-TPU 1 | 15 | DMAc | Water/IPA 50/50 | 80 | wet |
| 6(*) | H-TPU 1 PEG200 | 12 3 | DMAc | water | 90 | wet |
| 7(*) | H-TPU 1 PEG200 | 12 3 | DMAc | Water/IPA 50/50 | 84 | wet |
| 8 | F-TPU 1 | 15 | DMAc | water | 98 | 43 |
| 9 | F-TPU 1 | 15 | TEP | water | 113 | 66 |
| 10 | F-TPU 1 PEG200 | 12 3 | TEP | water | 110 | 63 |
| 11 | F-TPU 3 | 15 | DMAc | water | 99 | 58 |
| 12 | F-TPU 2 | 15 | TEP | water | 109 | 64 |
| 13 | F-TPU 2 PEG200 | 12 3 | TEP | water | 120 | 68 |
| 14(*) | H-TPU 2 | 15 | DMAc | water | 93 | wet |

(*)comparison

The above results show that the porous membranes according to the present invention are both highly hydrophobic and highly oleophobic. On the other hand, the porous membranes obtained with the hydrogenated polyurethane polymers (H-TPU 1 and 2) are less hydrophobic that the porous membranes according to the present invention and are not oleophobic, i.e. the drop of hexadecane penetrates into the membrane ("wet" in Table 2).

TABLE 3

| Membrane No. | Thickness (μm) | Porosity (%) | Stress at break (MPa) | Strain at break (%) |
|---|---|---|---|---|
| 1 | 108 | 78 | 2.1 | 381 |
| 2 | 70 | 74 | 1.8 | 377 |
| 4(*) | 140 | 86 | 1.8 | 328 |
| 6(*) | 86 | 85.5 | 1.9 | 225 |

(*)comparison

When comparing membranes 1 and 4(*) and membranes 2 and 6(*), the above results show that the porous membranes according to the present invention have better mechanical properties than the porous membranes obtained with the hydrogenated polyurethane polymers (H-TPU).

The results obtained for membranes prepared following Method B as disclosed above are summarized in the following Table 4. Non-treated commercial filters were used as comparison.

TABLE 4

| | SCA C16 (°) | |
|---|---|---|
| Filter | Not treated | Treated according to Method B |
| PP fiber (A) | wet | 62 |
| PP fiber (B) | wet | 55 |
| PBT fiber | wet | 69 |
| Glass fiber | wet | 100 |

PP = polypropylene
PBT = polybutylene terephthalate

The invention claimed is:

1. A porous membrane comprising at least one layer obtained from a composition (C), said composition (C) comprising:

at least one F-TPU polymer, which is a fluorinated polyurethane polymer comprising recurring units derived from:

optionally, at least one polymer (a), wherein polymer (a) is a diol selected from the group consisting of polyether diols, poly-ester diols, polybutadiene-diols and polycarbonate-diols;

at least one polymer (b), wherein polymer (b) is a hydroxy-terminated (per)fluoropolyether polymer with a (per)fluoropolyoxy alkylene chain [chain ($R_{pf}$)] having two chain ends, wherein both chain ends terminate with at least one —OH and chain $R_{pf}$ is a chain of formula HO-D-$(CFX^{\#})_{z1}$—O$(R_f)(CFX^*)_{z2}$-D*-OH, wherein z1 and z2, equal or different from each other, are equal to or higher than 1; $X^{\#}$ and $X^*$, equal or different from each other, are —F or —$CF_3$, provided that when z1 and/or z2 are higher than 1, $X^{\#}$ and $X^*$ are —F;

D and D*, equal or different from each other, are an alkylene chain comprising from 1 to 6 carbon atoms, said alkylene chain being optionally substituted with at least one perfluoroalkyl group comprising from 1 to 3 carbon atoms; and ($R_f$) comprises repeating units R°, said repeating units being independently selected from the group consisting of:

(i) —CFXO—, wherein X is F or $CF_3$;

(ii) —CFXCFXO—, wherein X, equal or different at each occurrence, is F or $CF_3$, with a proviso that at least one of X is —F;

(iii) —$CF_2CF_2CW_2O$—, wherein each W, equal or different from each other, are F, Cl, or H;

(iv) —$CF_2CF_2CF_2CF_2O$—;

(v) —$(CF_2)_j$—CFZ—O— wherein j is an integer from 0 to 3 and Z is a group of general formula —O—$R_{(f-a)}$-T, wherein $R_{(f-a)}$ is a fluoropolyoxyalkene chain comprising a number of repeating units from 0 to 10, said repeating units being chosen among the following: —CFXO—, —$CF_2CFXO$—, —$CF_2CF_2CF_2O$—, or —$CF_2CF_2CF_2CF_2O$—, with each of X being independently F or $CF_3$ and T being a $C_1$-$C_3$ perfluoroalkyl group;

at least one monomer (c), wherein monomer (c) is an aromatic, aliphatic or cycloaliphatic diisocyanate; and at least one monomer (d), wherein monomer (d) is an aliphatic, cycloaliphatic or aromatic diol having from 1 to 14 carbon atoms; and optionally at least one further ingredient.

2. The porous membrane according to claim 1, wherein said membrane has an average pore diameter of at least 0.001 μm and of at most 50 μm.

3. The porous membrane according to claim 1, wherein said optional at least one polymer (a) is selected from the group consisting of poly (ethylene glycol), poly (propylene) glycol, poly (tetramethylene) glycol (PTMG), poly (1,4-butanediol) adipate, poly (ethanediol-1,4-butanediol) adipate, poly (1,6-hexandiol-neopentyl) glycol adipate, polycaprolactone-diol (PCL) and polycarbonate-diol.

4. The porous membrane according to claim 1, wherein said at least one monomer (c) is selected from the group consisting of 4,4'-methylene-diphenylene-diisocyanate (MDI), 1,6-hexane-diisocyanate (HDI), 2,4-toluene-diisocyanate, 2,6-toluene-diisocyanate, xylilen-diisocyanate, naphthalene-diisocyanate, paraphenylen-diisocyanate, hexamaethylene-diisocyanate, isophorone-diisocyanate, 4,4' dicyclohexyl-methane-diisocyanate and cyclohexyl-1,4-diisocyanate.

5. The porous membrane according to claim 1, wherein said at least one monomer (d) is selected from the group consisting of ethylene-glycol, 1,4-butanediol (BDO), 1,6-hexane diol (HDO), N, N-diethanolamine and N, N-diisopropanolaniline.

6. A process for manufacturing the porous membrane according to claim 1, said process comprising:
processing a composition (C) thereby providing a film, and processing the film thereby providing a porous membrane.

7. A method for filtering a liquid and/or gas phase comprising one or more solid contaminants, said method comprising contacting said liquid phase and/or gas phase comprising one or more solid contaminants with at least one porous membrane as defined in claim 1.

8. The method according to claim 7, wherein said solid contaminants are microorganisms selected from the group consisting of bacteria, algae, fungi, protozoa and viruses.

9. The method according to claim 7, wherein said porous membrane has an average pore diameter of at least 0.001 μm and of at most 5 μm.

10. The method according to claim 7, wherein said porous membrane has an average pore diameter of at least 5 μm and of at most 50 μm.

11. A fabric comprising at least two layers, wherein at least one layer comprises a porous membrane as defined in claim 1.

12. The fabric according to claim 11, wherein said porous membrane has an average pore diameter of at least 0.001 μm and of at most 5 μm.

\* \* \* \* \*